United States Patent [19]

Jaeschke

[11] 3,996,485

[45] Dec. 7, 1976

[54] ELECTROMAGNETIC COUPLING AND COOLING SYSTEM THEREFOR

[75] Inventor: Ralph L. Jaeschke, Kenosha, Wis.

[73] Assignee: Eaton Corporation, Cleveland, Ohio

[22] Filed: Apr. 28, 1975

[21] Appl. No.: 572,697

Related U.S. Application Data

[63] Continuation-in-part of Ser. No. 484,210, June 28, 1974, abandoned.

[52] U.S. Cl. ............................... 310/103; 310/63; 310/105
[51] Int. Cl.$^2$ ....................................... H02K 49/04
[58] Field of Search ............................. 310/60–65, 310/57, 58, 59, 93, 103, 105

[56] References Cited
UNITED STATES PATENTS

| | | | |
|---|---|---|---|
| 2,345,850 | 4/1944 | Winther | 310/52 X |
| 2,745,974 | 5/1956 | Oetzel | 310/93 |
| 3,641,375 | 2/1972 | Moyer | 310/105 |
| 3,742,270 | 6/1973 | Jaeschke | 310/105 |

*Primary Examiner*—Donovan F. Duggan
*Attorney, Agent, or Firm*—Teagno & Toddy

[57] ABSTRACT

An electromagnetic coupling is provided of the type including a housing, a rotor member disposed in the housing, and an inductor drum means disposed in the housing and rotatable relative to the rotor member. A coil means electromagnetically couples the rotor member and the inductor drum means. The inductor drum means includes a generally cylindrical drum portion having a substantially uniform magnetic reluctance. The drum portion defines an outer, heat-dissipating surface which includes a plurality of circumferentially extending, heat-dissipating grooves spaced apart along the longitudinal axis of the drum portion. A means is included for directing cooling fluid into the housing to dissipate the heat generated in the inductor drum means, and a plurality of fluid-directing members are disposed on the cylindrical drum portion adjacent the heat-dissipating surface.

19 Claims, 6 Drawing Figures

ELECTROMAGNETIC COUPLING AND COOLING SYSTEM THEREFOR

CROSS REFERENCE TO RELATED APPLICATION

This application is a continuation-in-part of my copending U.S. application Ser. No. 484,210, Filed June 28, 1974 now abandoned.

BACKGROUND OF THE DISCLOSURE

1. Field of the Invention

The present invention relates to electromagnetic coupling devices, and more particularly, to a system for dissipating heat from the inductor drum of such devices.

Electromagnetic couplings of the type well known in the art include a rotor which is disposed within a rotatable inductor drum. A coil is energized to generate a magnetic field which electromagnetically couples the rotor and drum so that torque may be transmitted therebetween. The passage of this magnetic field through the rotor and the inductor drum results in the generation of heat during the transmission of torque, partially as a result of "slip" between the rotor and the inductor drum (power in = power out + heat). The dissipation of this heat has long been a problem for those working in this art and different types of cooling systems have been tried in an effort to more effectively dissipate the generated heat. Generally, the heat buildup limits the power ratio of the coupling. Thus, by increasing the heat dissipation of a particular size coupling, the power ratio can be increased.

2. Prior Art

In many different embodiments of electromagnetic couplings, heat-dissipating fins have been provided which extend either radially or axially from the exterior of the inductor drum. However, such fins have not provided sufficient cooling of the coupling and, in addition, may create enough noise that a silencer is required. U.S. Pat. No. 2,345,850 illustrates an example of a typical fin cooling system.

In an effort to utilize the flow of cooling fluid more effectively, the device shown in U.S. Pat. No. 2,745,974 includes an inductor drum encircling the field pole output member. This output member comprises a series of circumferential, spaced magnetic poles excited by the field coil, the poles being formed of a ferromagnetic material. The inductor member includes a plurality of fins and permits air flow through tnhe circumferential slots defined by adjacent magnetic poles, drawing air through the gap between the poles and the fins, then over the fins. One disadvantage of this arrangement is the interruption of eddy currents and the related magnetic reluctance caused by the circumferential cooling slots, thereby resulting in a reduced torque-transmitting capacity.

The device illustrated in U.S. Pat. No. 3,641,375, assigned to the assignee of the present invention, utilizes a series of pressurized chambers spaced circumferentially around the housing of the coupling. The cooling fluid (such as air) from these pressurized chambers impinges against the surface of the inductor drum, then passes to an adjacent exhaust pocket. While the cooling ability of this device was generally acceptable, it required a means for pressurizing the pressure chambers, such as a blower or fan. In addition, the arrangement of alternating pressure chambers, exhaust pockets and the associated baffles was difficult and expensive to manufacture and required excessive space within the housing of the coupling.

SUMMARY OF THE INVENTION

Accordingly, it is a provision of the present invention to provide an improved cooling system for dissipating heat from the inductor drum of an electronmagnetic coupling. More specifically, the present invention provides a cooling system for an electromagnetic coupling in which there is a more efficient flow of cooling fluid to dissipate heat from the inductor drum.

It is another provision of the present invention to maximize the heat transfer area of the inductor drum without interfering with the flux path impressed across the drum during operation of the coupling.

These and other provisions of the present invention are accomplished by an improved cooling system for an electromagnetic coupling of the type including a housing, a rotor member disposed within the housing, an inductor drum means disposed in the housing and a coil means for electromagnetically coupling the rotor member and the inductor drum means. The inductor drum means includes a generally cylindrical drum portion having a substantially uniform magnetic reluctance and the drum portion defines an outer, heat-dissipating surface which includes a plurality of circumferentially extending, heat-dissipating grooves spaced apart along the longitudinal axis of the drum portion. Also included is a means for directing cooling fluid into the housing to dissipate heat generated in the inductor drum means. A plurality of fluid-directing members is disposed adjacent the outer, heat-dissipating surface. The fluid-directing members direct the cooling fluid inwardly into the heat-dissipating grooves to cool the inductor drum means.

In accordance with another aspect of the present invention, the heat-dissipating grooves each terminate, inwardly, in a bottom surface which receives the inwardly directed flow of cooling fluid and directs the cooling fluid outwardly from the drum portion.

DESCRIPTION OF THE PREFERRED EMBODIMENTS

Figure 1:
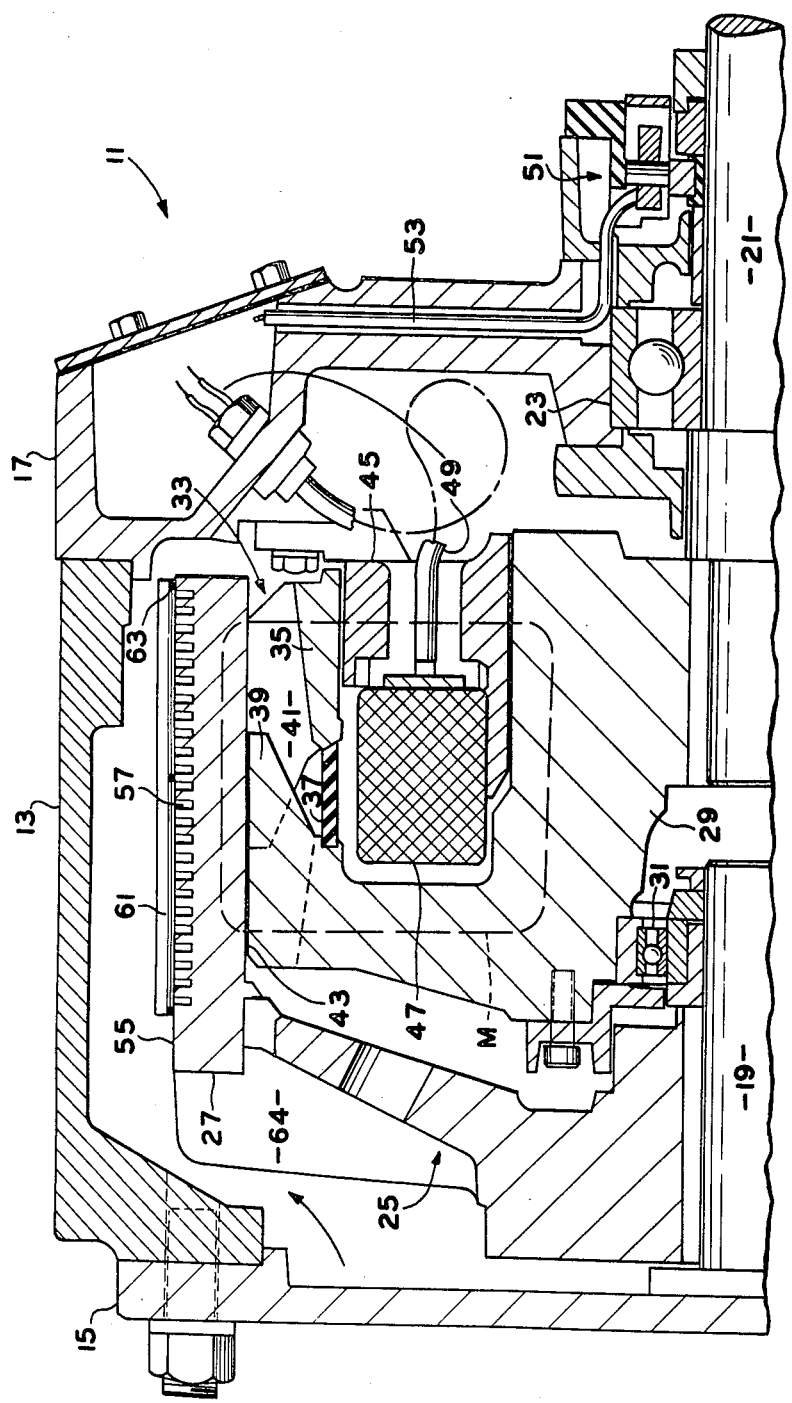
FIG. 1 is an axial half-section of a typical electromagnetic coupling to which the cooling system of the present invention may be adapted.

Referring now to the drawings, which are for the purpose of illustrating a preferred embodiment of the invention and not for limiting the same, FIG. 1 is a longitudinal half-section of a typical eddy-current coupling device to which the present invention may be adapted. The coupling device shown herein, generally designated 11, includes a central housing 13 and end-bells 15 and 17. The end-bells 15 supports a drive shaft 19 and the end-bell 17 supports a driven shaft 21, which is also supported by a set of bearings 23.

Keyed to the drive shaft 19 is an inductor assembly 25 including an inductor drum 27 which will be described in greater detail subsequently, but which is composed of a ferromagnetic material such as iron or steel, and has a substantially uniform magnetic reluctance. Keyed to the driven shaft 21 is a magnetic field pole member 29, and a pilot bearing 31 is located between the drive shaft 19 and the pole member 29. The field pole member 29 includes a magnetic pole assembly 33, comprising a ring 35 supported on the field member 29 by a nonmagnetic spacer 37. The field pole member 29 and the ring 35 carry polar teeth or poles 39 and 41 respectively which are interdigitated. Between the teeth 39 and 41 and the inner surface of the inductor drum 27 is a narrow air gap or space 43 which allows relative rotation of the inductor drum 27 and the pole member 29.

End-bell 17 has attached thereto a stationary ring-shaped magnetic support 45 which supports an annular field coil 47. An electrical connection 49 is shown for exciting the field coil 47. A tachometer-type generator 51 driven by driven shaft 21 may be associated with the present coupling. The tachometer generator 51 establishes a signal on line 53 which is indicative of the speed of the output shaft 21 and which signal may be utilized by electrical circuitry not illustrated for controlling the speed of the output shaft 21, in a well known manner which forms no part of the present invention. It should be appreciated that the excitation of field coil 47 establishes a flux path, represented by the dotted line M, which electromagnetically couples the field pole member 29 and the inductor drum 27 so that rotation of the inductor drum 27 effects rotation of the pole member 29. The magnitude of the energization of field coil 47 controls the slip between the pole member 29 and the inductor drum 27 in a well known manner.

During operation of the electromagnetic coupling device 11, relative rotation between the pole member 29 and inductor drum 27 results in the generation of eddy-currents in the drum 27 (thus, the term "eddy-current coupling"). These eddy-currents produce a magnetic field which permits the transmission of torque from the inductor assembly 25 to the pole member 29 as discussed above. Normally, a certain amount of "slip" occurs during the rotation of the assembly 25 and pole member 29 and such slip, or difference in rotational speed, generates heat in the inductor drum 27.

Figure 2:
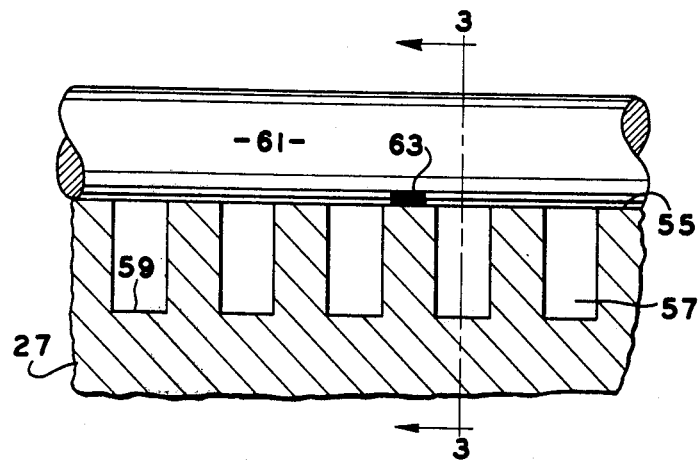
FIG. 2 is an enlarged fragmentary cross-sectional view more fully illustrating the heat-dissipating grooves.
Figure 3:
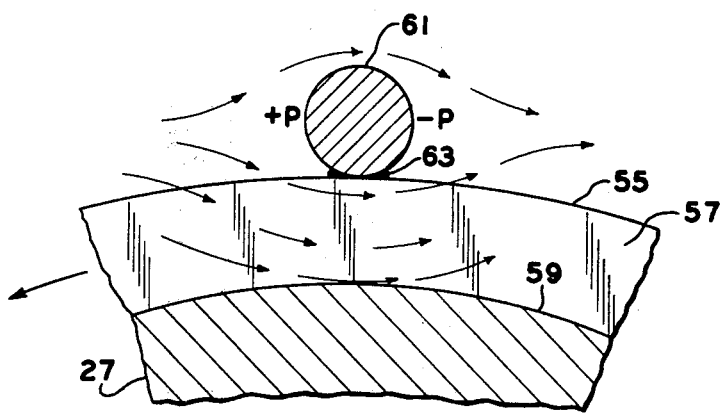
FIG. 3 is a transverse cross-sectional view taken along line 3—3 of FIG. 2.

As is shown in FIG. 1, and on a larger scale in FIGS. 2 and 3, the inductor drum 27 which, in the subject embodiment is cylindrical, has an outer, heat-dissipating surface 55. The inductor drum 27 also includes a plurality of heat-dissipating grooves 57, each of which terminates at its radially-inward extremity in a bottom surface 59. While the heat-dissipating grooves 57 may have any one of a number of configurations, such as one continuous, helical groove, the groove arrangement in the subject embodiment comprises a plurality of individual, circumferentially extending grooves which are spaced apart in a direction parallel to the longitudinal axis of the cylindrical portion of the inductor drum means 25.

The inductor assembly 25 further includes a plurality of fluid-directing members 61 attached to the outer, heat-dissipating surface 55. The members 61 may be closely spaced apart with respect to the surface 55, but perferably, are fixedly attached continguous with the surface 55, as by means of a series of weldments 63. The fluid-directing members 61, as shown herein, are generally cylindrical, but may have various other cross-sectional configurations such as oval, which will achieve the purpose of directing the cooling medium into the heat-dissipating grooves, as will be described in greater detail subsequently. In addition to directing cooling fluid, the members 61, while moving with the rotating drum 27 and in contact with the heat-dissipating surface 55, serve to dissipate heat conducted thereto, in the nature of cooling vanes.

It will be appreciated that the coupling device 11 may include some means (not shown) for directing cooling fluid to the interior of the housing 13, such as a blower (not shown), or even merely an orifice or opening in the housing, although it has been found possible, with the use of the present invention, to obtain sufficient heat transfer to eliminate the need for any auxiliary cooling means.

Referring now primarily to FIG. 3, the inductor drum 27 is illustrated as rotating in a counterclockwise direction. Thus, each of the members 61 is moving in the same direction into the cooling medium, normally air. The movement of the members 61 into the cooling air within the housing 13 causes a buildup of positive air pressure (+P) adjacent the leading surface of the member 61, and a region of negative (−P) air pressure adjacent the trailing surface. The air impinging against the member is divided as shown in FIG. 3 with a portion of the air being forced inwardly into the heat-dissipating grooves 57. At least a portion of the cooling air entering the groove 57 impinges against the bottom surface 59 and is thereby redirected outwardly from the groove 57 and away from the drum 27, transferring heat away from the bottom surface 59, which is especially important in view of the fact that the eddy-currents result in the generation of heat deep within the drum portion 27. It should be clearly understood that the arrows in FIG. 3 are merely intended to represent the incidence of air into the groove as well as the flow of air therefrom, and are not intended to indicate the actual angles of incidence and redirection, which would be determined by the particular geometry of the fluid-directing members 61 and grooves 57.

In the subject embodiment, 12 of the members 61 have been utilized, each of which extends in a direction substantially parallel to the longitudinal axis of the cylindrical drum portion 27. It is normally preferred, for uniform cooling as well as for rotational balance of the inductor assembly 25, that the fluid-directing members 61 be spaced circumferentially about the surface 55 at uniform intervals. The arrangement of the members 61 parallel to the axis of the drum is preferred because the members are then oriented perpendicular to their direction of movement so that they function most efficiently to direct the cooling fluid into the grooves 57, the members 61 preferably being substantially perpendicular to the grooves.

In tests which were run for the purpose of evaluating the performance of the cooling system of the present invention, two eddy-current coupling devices of the type illustrated and described herein were utilized. One of the devices (referred to as "conventional"), was constructed as shown in FIG. 1 but without the fluid-directing members 61, whereas the other device (referred to as "modified"), included the members 61.

Each of the devices was subjected to a load of 25 HP and the conventional device ran for 90 minutes while the modified coupling was tested for 120 min. The improved cooling ability of the present invention was illustrated by the fact that during the test, the temperature of the surface 55 of the inductor drum 27 rose 319° C on the conventional device, but only 236° c on the modified coupling. Furthermore, the temperature of the housing 13 reached 109° C on the conventional device but only 90° C on the modified device, and the temperature of the pilot bearing 31 rose to 100° C on the conventional coupling and only 78° C on the modified device. Similar results were achieved with a pair of coupling devices subjected to a 20 HP load. For example, the temperature of the surface 55 of the inductor drum 27 rose 256° C on the conventional coupling and 193° C on the modified unit.

Although the specific heat transfer mechanism of the present invention is not completely understood, it has been hypothesized that because heat transfer is a function of the temperature differential between the drum and the incoming cooling fluid, the present invention increases the heat transfer capability of the cooling fluid by directing the cooling medium into the grooves 57 in such a way that it is quickly directed out of the groove. Thus, the cooling air is in the groove for only a short time during which its heat transfer or heat absorption capability is at a maximum because the temperature differential between the air and the drum is at a maximum. If the cooling air passes through the grooves in such a way that it remains in the groove for a longer period of time, the heat transfer ability of the air decreases as it becomes warmer and the temperature differential between the air and the drum decreases. Therefore, it is an important feature of the present invention that fluid-directing means be provided adjacent the heat-dissipating surface of the inductor drum for directing the cooling fluid inwardly in such a way that the relatively cool fluid enters the heat-dissipating grooves and is quickly directed outwardly from the grooves, such as by means of the air impinging against the bottom surface of the groove and being directed outwardly by the bottom surface.

Figure 4:
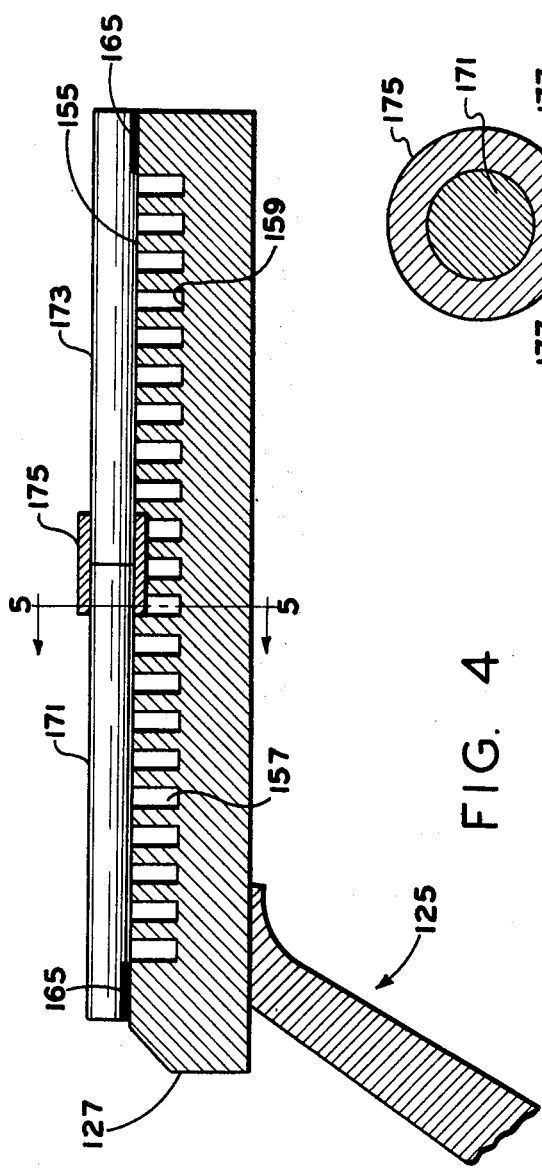
FIG. 4 is an enlarged fragmentary cross-sectional view, illustrating an alternative embodiment of the present invention.
Figure 5:
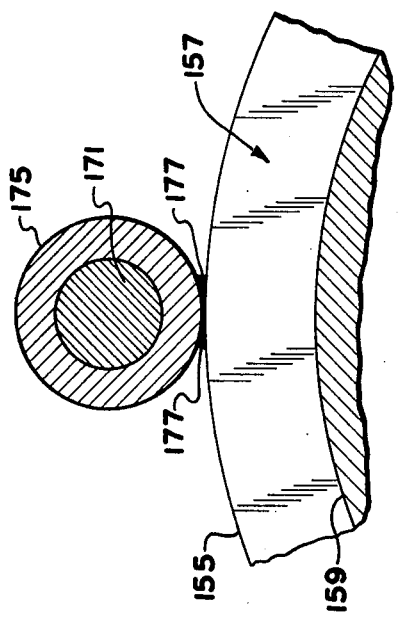
FIG. 5 is a further enlarged cross-sectional view taken generally along line 5—5 of FIG. 4.

Referring now to FIGS. 4 and 5, the alternative embodiment shown therein is directed to the problem which occurs during the operation of the electromagnetic device of FIGS. 1-3. During operation, the inductor drum typically undergoes a temperature rise of about 600° F. (310° C.), while the fluid-directing member remains at a temperature of about 200° F. (94° C.) lower than that of the drum. Such a temperature rise in the drum typically causes an increase in the overall length of the drum portion, due to thermal expansion, of about 0.025 inches (0.063 cm). Such a differential thermal expansion causes a stress load at the weldments attaching the fluid-directing members to the drum. It has been determined that for the temperatures and thermal expansion discussed above, the stress load at the weldment is in the range of 90,000 psi ($6.2 \times 10^8$ Pa).

Referring again specifically to FIG. 4 wherein like elements are referenced by like numerals, plus 100, there is shown a fragmentary view of an inductor assembly 125 including an inductor drum 127 having an outer, heat-dissipating surface 155. The surface 155 defines a plurality of heat-dissipating grooves 157, each of which terminates at its radially-inward extremity in a bottom surface 159. In this embodiment, each of the fluid-directing members 61 of FIGS. 1-3 is replaced by a pair of axially-aligned fluid-directing members 171 and 173. Each of the members 171 and 173 is fixedly attached to the inductor drum 127 by means of a weldment 165, which as shown, is preferably disposed at the ends of the members 171 and 173 opposite their adjacent ends. To overcome the problems relating to the thermal expansion of the inductor drum 127, there is provided an expansion means in the form of a slip joint 175 surrounding the adjacent ends of the members 171 and 173 and preferably, fixedly attached to the surface 155 by a plurality of weldments 177 (see FIG. 5).

It will be understood that the slip joint 175 may take many other physical forms within the intended scope of the present invention, as long as it restrains the adjacent ends of the members 171 and 173 against relative transverse movement, while permitting relative axial movement in response to thermal expansion of the inductor drum 127. As may be seen in FIG. 4, the outer surface 155 preferably has a reduced radius over the axial extent of the inductor drum 127 where the slip joints 175 are to be seated, such that the members 171 and 173 may engage the slip joint 175 with a sliding fit while being in engagement with, or closely spaced to the remainder of outer surface 155.

Figure 6:
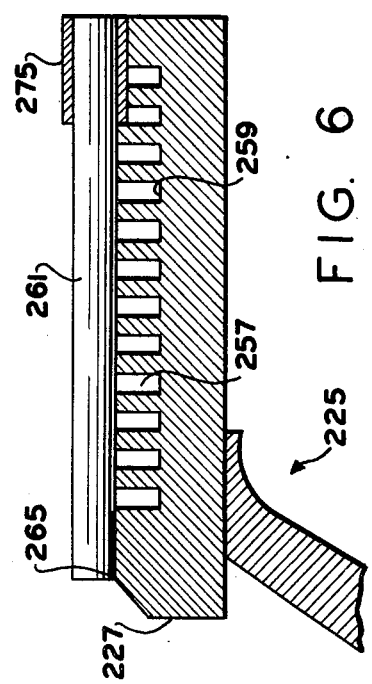
FIG. 6 is a fragmentary cross-sectional view, illustrating another alternative embodiment of the present invention.

Referring now to FIG. 6, the alternative embodiment shown therein is also directed to the problem of thermal expansion as discussed in connection with FIGS. 4 and 5. In FIG. 6, wherein like elements are referenced by like numerals, plus 200, there is shown a fragmentary view of an inductor assembly 225, including an inductor drum 227 having an outer, heat-dissipating surface 225. The surface 255 defines a plurality of heat-dissipating grooves 257, each of which terminates at its radially-inward extremity in a bottom surface 259. In this embodiment, each of the fluid-directing members 261 has one end fixedly attached to the inductor drum 227 by means of a weldment. The opposite end of each member 261 is slidably disposed in a slip joint 275, which is preferably attached to the surface 255 in a manner similar to that shown in FIG. 5.

The invention has been described in great detail sufficient to enable one of ordinary skill in the art to make and use the same. Obviously, modifications and alterations of the preferred embodiments will occur to others upon a reading and understanding of the specification and it is my intention to include all modifications and alterations as part of my invention insofar as they come within the scope of the appended claims.

I claim:
1. An electromagnetic coupling comprising:
   a. a housing;
   b. a rotor member disposed in said housing;
   c. inductor drum means disposed in said housing and rotatable relative to said rotor member;
   d. coil means for electromagnetically coupling said rotor member and said inductor drum means;
   e. said inductor drum means including a generally cylindrical drum portion having a substantially uniform magnetic reluctance in a direction generally parallel to the longitudinal axis of said cylindrical drum portion, said drum portion defining an outer, heat-dissipating surface, said heat dissipating surface including a plurality of circumferentially extending, heat-dissipating grooves spaced apart along the longitudinal axis of said cylindrical drum portion;

f. means for directing cooling fluid into said housing to dissipate heat generated in said inductor drum means; and g. a plurality of fluid-directing means attached to said outer, heat-dissipating surface of said inductor drum means for rotation therewith, said fluid directing means directing said cooling fluid inwardly into said heat-dissipating grooves to cool said inductor drug means.

2. An electromagnetic coupling as defined in claim 1 wherein said cylindrical drum portion of said inductor drum means is substantially impermeable to radial flow of said cooling fluid.

3. An electromagnetic coupling as defined in claim 1 wherein each of said plurality of heat-dissipating grooves terminates, inwardly, in a bottom surface, said fluid-directing means direct said cooling fluid inwardly to contact said bottom surface of said heat-dissipating grooves and said bottom surface directs said cooling fluid outwardly from said cylindrical drum portion to dissipate heat from said inductor drum means.

4. An electromagnetic coupling as defined in claim 1 wherein said fluid-directing means are elongated, generally cylindrical members.

5. An electromagnetic coupling as defined in claim 4 wherein each of said plurality of fluid-directing means are disposed generally parallel to the longitudinal axis of said drum portion, and extend across each of said plurality of circumferentially extending, heat-dissipating grooves.

6. An electromagnetic coupling as defined in claim 1 wherein each of said fluid-directing means includes expansion means to accommodate thermal expansion of said drum portion.

7. An electromagnetic coupling is defined in claim 6 wherein said expansion means comprises:
   a. each of said fluid-directing means including at least a pair of axially-aligned members; and
   b. a joint member restraining the adjacent ends of said axially-aligned members against relative transverse movement.

8. An electromagnetic coupling is defined in claim 7 wherein said axially-aligned members are elongated, generally cylindrical members, and said joint member comprises a generally cylindrical sleeve member surrounding the adjacent ends of said axially-aligned members, permitting relative axial movement thereof.

9. An electromagnetic coupling as defined in claim 6 wherein said expansion means comprises each of said fluid-directing means including an elongated member having one end thereof fixedly attached to said drum portion and associated with the other end of said elongated member for relative axial movement therebetween.

10. An electromagnetic coupling comprising:
    a. a housing;
    b. a rotor member rotatably disposed within said housing;
    c. inductor drum means rotatably disposed in said housing and rotatable relative to said rotor member;
    d. said inductor drum means including a generally cylindrical drum portion defining a generally cylindrical, outer, heat-dissipating surface, said heat-dissipating surface defining at least one circumferentially extending, heat-dissipating grove extending substantially perpendicular to the longitudinal axis of said cylindrical drum portion;

e. coil means for establishing a flux path upon energization thereof to electromagnetically couple said rotor member and said inductor drum means, said flux path extending through said rotor member longitudinally through said cylindrical drum portion to electromagnetically couple said rotor member and said inductor drum means, said drum portion having a substantially uniform magnetic reluctance;

f. means for directing cooling fluid to the interior of said housing to dissipate heat generated in said inductor drum means, said cylindrical drum portion being substantially impermeable to radial flow of said cooling fluid; and g. a plurality of fluid-directing members disposed contiguous to said outer, heat-dissipating surface, and attached thereto, said fluid directing members directing said cooling fluid inwardly into said heat-dissipating groove to effect cooling of said inductor drum means.

11. An electromagnetic coupling as defined in claim 10 wherein each of said plurality of fluid-directing members is disposed generally parallel to the longitudinal axis of said cylindrical drum portion.

12. An electromagnetic coupling as defined in claim 11 wherein said heat-dissipating groove terminates, inwardly, in a bottom, heat-dissipating surface and rotation of said cylindrical drum portion defines a leading surface and a trailing surface on each of said plurality of fluid-directing members, said rotation causing positive pressure adjacent said leading surface and negative pressure adjacent said trailing surface, the differential between said positive pressure and said negative pressure forcing a portion of said cooling fluid inwardly into said-dissipating groove to impinge upon said bottom heat-dissipating surface to cool said cylindrical drum portion.

13. An electromagnetic coupling as defined in claim 10 wherein said fluid-directing members are elongated, generally cylindrical members.

14. Apparatus comprising:
    a. first and second relatively rotatable mechanism;
    b. said first mechanism including a generally cylindrical drum portion being disposed about said second mechanism;
    c. said first and second mechanism, during operative association, interacting to generate heat in said drum portion;
    d. said drum portion defining an outer, heat-dissipating surface, said heat-dissipating surface defining at least one circumferentially-extending, heat-dissipating groove oriented generally perpendicular to the longitudinal axis of said cylindrical drum portion; and
    e. a plurality of fluid-directing means attached to said drum portion, and disposed adjacent said outer, heat-dissipating surface, said fluid-directing means being operable to direct cooling fluid into said heat-dissipating groove to effect cooling of said drum means.

15. Apparatus as defined in claim 14 wherein each of said fluid-directing means is fixedly attached to said drum portion at at least two spaced apart locations, and includes expansion means to accommodate thermal expansion of said drum portion while minimizing stress at the attachment of said fluid-directing means to said drum portion.

16. Apparatus as defined in claim 15 wherein said expansion means comprises:

a. each of said fluid-directing means including at least a pair of axially-aligned members; and
b. joint means restraining the adjacent ends of said axially-aligned members against relative transverse movement.

17. Apparatus as defined in claim 16 wherein said axially-aligned members are elongated, generally cylindrical members, and said joint means comprises a generally cylindrical sleeve member surrounding the adjacent ends of said axially-aligned members, permitting relative axial movement thereof.

18. Apparatus as defined in claim 14 wherein each of said fluid-directing means includes expansion means to accommodate thermal expansion of said drum portion in excess of thermal expansion of said fluid-directing means.

19. Apparatus as defined in claim 18 wherein each of said fluid-directing means includes an elongated member having one end thereof fixedly attached to said drum portion and restraint means fixedly attached to said drum portion and asssociated with the other end of said elongated member for relative axial movement therebetween.

* * * * *

UNITED STATES PATENT AND TRADEMARK OFFICE
CERTIFICATE OF CORRECTION

PATENT NO. : 3,996,485
DATED : December 7, 1976
INVENTOR(S) : Ralph L. Jaeschke

It is certified that error appears in the above–identified patent and that said Letters Patent are hereby corrected as shown below:

| | |
|---|---|
| Col. 1, line 50: | "the" is misspelled. |
| Col. 2, line 7: | "electromagnetic" is misspelled. |
| Col. 4, line 38: | eddy-currents should read "eddy-currents". |
| 47: | "12" should not be in bold face type. |
| Col. 5, line 7: | "236°c" should read ---236°C---. |
| line 54: | "0.025 inches" should read ----.025"--- AND "(0.063cm)" should read ---(.063cm)---. |
| Col. 7, line 52: | After "portion" the following was deleted: ---and restraint means fixedly attached to said drum portion---. |
| line 66: | "groove" is misspelled. |
| Col. 8, line 34: | "said-dissipating" should read ---said heat-dissipating---. |
| line 41: | "mechanism" should read "mechanisms". |

Signed and Sealed this

First Day of March 1977

[SEAL]

Attest:

RUTH C. MASON
*Attesting Officer*

C. MARSHALL DANN
*Commissioner of Patents and Trademarks*